United States Patent [19]

Hashimoto et al.

[11] Patent Number: 4,861,682

[45] Date of Patent: Aug. 29, 1989

[54] CLAD STEEL MATERIALS HAVING EXCELLENT DUCTILITY AND CORROSION RESISTANCE

[75] Inventors: Yoshio Hashimoto; Tsuyoshi Kawano; Kaname Hasuka; Seiji Otomo, all of Kitakyushu, Japan

[73] Assignee: Nippon Steel Corporation, Tokyo, Japan

[21] Appl. No.: 150,496

[22] Filed: Feb. 1, 1988

Related U.S. Application Data

[63] Continuation of Ser. No. 868,104, May 29, 1986, abandoned.

[30] Foreign Application Priority Data

| | | | |
|---|---|---|---|
| May 29, 1985 | [JP] | Japan | 60-114326 |
| May 29, 1985 | [JP] | Japan | 60-114327 |
| Jun. 26, 1985 | [JP] | Japan | 60-137820 |
| Jan. 7, 1986 | [JP] | Japan | 61-272 |
| Jan. 24, 1986 | [JP] | Japan | 61-11887 |
| Jan. 24, 1986 | [JP] | Japan | 61-11888 |

[51] Int. Cl.$^4$ ............................................. B32B 15/18
[52] U.S. Cl. ..................................... 428/685; 428/682
[58] Field of Search ...................... 428/682, 683, 685; 148/11.5 Q; 420/126, 127

[56] References Cited

U.S. PATENT DOCUMENTS 3,693,242  9/1972  Chivinsky ........................ 29/480
4,464,209  8/1984  Taira et al. ...................... 428/685

FOREIGN PATENT DOCUMENTS 54-12883  5/1979  Japan.
58-15310  3/1983  Japan.
58-19391  4/1983  Japan.
59-67319  4/1984  Japan.
60-43433  3/1985  Japan.
60-43465  3/1985  Japan.

Primary Examiner—Deborah Yee
Attorney, Agent, or Firm—Wenderoth, Lind & Ponack

[57] ABSTRACT

A stainless clad plate or sheet (herein called sheet) comprising a super-low carbon steel layer containing at least one of Ti and Nb (Ti+Nb$\leq$0.15% and $$\frac{Nb}{7.74C} + \frac{Ti}{4C + 3.43N} \geq 0.8\%)$$

and an austenite stainless steel layer on one or both sides of the carbon steel layer. The thickness of the stainless steel layer is preferably from 2.5 to 30% of the total thickness of the clad steel sheet. The stainless clad steel sheet is produced preferably by continuous casting stainless steel melt on the carbon steel slab, hot and cold rolling the stainless clad steel slab, and annealing under specific conditions for desired properties.

9 Claims, 1 Drawing Sheet (CLAD THICKNESS : 0~60%)

CLAD STEEL MATERIALS HAVING EXCELLENT DUCTILITY AND CORROSION RESISTANCE

This application is a continuation of now abandoned application Ser. No. 868,104, filed May 29, 1986.

BACKGROUND OF THE INVENTION

1. Field of the Invention

The present invention relates to clad steel materials of low carbon steel and stainless steel having excellent elongation and corrosion resistance and also relates to the production thereof.

2. Description of Prior Arts

Conventionally, sheet steel materials, as typically represented by sheet steel materials used for automobiles and electrical appliances, are generally given a chemical treatment such as a phosphate treatment, after the press forming, and further applied with a paint coating to provide the required corrosion resistance. And for this purpose, low-carbon Al-killed cold reduced steel sheet materials having excellent deep-drawability have long been used.

On the other hand, austenitic series of stainless steel materials are considered to be most excellent with respect to the corrosion resistance, but they are remarkably more costly than plain carbon steel materials. Therefore, clad steel materials of carbon steel and stainless steel have been conventionally proposed and developed as steel sheet materials satisfying both the production cost requirement and the corrosion resistance requirement.

However, in cases of clad steel materials of carbon steel and stainless steel, the high affinity between carbon and chromium causes migration of carbon from the carbon steel layer to the stainless steel layer, resulting in lowered corrosion resistance. For prevention of the carbon migration, it has been proposed to add carbide formers to the carbon steel, as disclosed in Japanese Patent Publication No. Sho 58-15310, Japanese Patent Publication No. Sho 58-19391 and U.S. Pat. No. 3,693,242. These proposed prior arts, however, are still confronted with problems that greater amounts of carbon and nitrogen are present in the carbon steel and greater amounts of titanium and niobium must be added to the carbon steel so that satisfactory workability cannot be obtained and the production cost is high. Other proposals have been made for preventing the carbon migration, including applying a nickel coating on the interface of the carbon steel layer and the stainless steel layer, and insertion of a nickel foil in the interface. These proposed arts suffer from a problem that the production cost is much increased.

Further these proposed arts rely solely upon the conventional hot pressure bonding method in which the component sheets are assembled and welded in a sandwich form and then hot rolled so that the production yield is low and the cost is high.

SUMMARY OF THE INVENTION

One of the objects of the present invention is to provide an austenitic stainless clad steel sheet excellent in electromagnetic heating property, corrosion resistance, workability, as well as economical advantage.

The clad steel material according to the present invention is a stainless clad steel comprising an extremely low carbon steel sheet and an austenite stainless steel sheet or layer covering at least one side of the carbon steel sheet.

The extremely low carbon steel sheet used in the present invention has the following composition:

| | |
|---|---|
| Carbon | not more than 0.0045% |
| Aluminum | not more than 0.080% |
| Manganese | not more than 0.5% |
| Nitrogen | not more than 0.0050%, and | at least one of titanium and niobium contained under the following conditions:

(Ti+Nb) ... not more than 0.15% and $$\frac{Nb}{7.74C} + \frac{Ti}{4C + 3.43N} \ldots \text{not less than } 0.8 \quad (1)$$

DETAILED DESCRIPTION OF THE INVENTION

Explanation will be given as to the reasons for limiting the contents of carbon, aluminum, nitrogen and manganese in the carbon steel sheet on which the stainless steel layer is clad.

Carbon, when contained in amounts more than 0.0045%, lowers the ductility and requires increased amounts of (Ti+Nb) for assuring the desired excellent deep-drawability. Also the carbon content more than 0.0045% increases the tendency of precipitation of chromium carbide at the intersurface of the carbon steel sheet and the stainless steel layer, which is detrimental to the desired corrosion resistance.

Thus the carbon content should preferably be maintained as low as possible while the lower limit of the carbon content will be determined depending on the steel making cost and it is not economically advantageous to maintain the carbon content less than 10 ppm from the point of the production cost. For these reasons the preferable range of the carbon content is from 0.0010 to 0.0040%.

Aluminum, is required in amounts not less than 0.005% for assuring the desired improvements in ageing property and workability by the addition of niobium and titanium to be fully developed, but an aluminum content more than 0.08% will result in only increased production cost without substantial improvements. Therefore, the preferable range for the aluminum content is from 0.015 to 0.060%.

Nitrogen tends to deteriorate the improvement effects by niobium and titanium additions on the workability and should be maintained at not more than 50 ppm and for more positively improving the workability, it is desirable to maintain the nitrogen content as low as possible and not more than 40 ppm. However, from the present status of the steel making art, it is not advantageous to maintain the nitrogen content lower than 5 ppm.

For applications where a high degree of elongation is required, it is desirable to maintain the manganese content not more than 0.50% for assuring good workability, and the highest degree of workability can be obtained by maintaining the manganese content not more than 0.35%. Regarding the lower limit of the manganese content, it is desired to maintain the manganese not lower than 0.05% for good hot workability. Silicon is not intentionally added because silicon tends to enlarge the ferrite grain size of a cold rolled and annealed steel sheet. However, not more than about 0.02% of silicon contained as an unavoidable impurity is not harmful and is permissible.

According to the present invention, at least one of titanium and niobium is added in the carbon steel on which the stainless steel layer is clad, in addition to the restrictions of the carbon and nitrogen contents as defined above, for the purposes of assuring excellent workability and for preventing the deterioration of workability due to ageing and the migration of carbon into the stainless steel layer from the carbon steel sheet. For these purposes, the contents of at least one of titanium and niobium must satisfy the following condition (1), $$\frac{Nb}{7.74C} + \frac{Ti}{4C + 3.43N} \ldots \text{not less than } 0.8 \quad (1)$$

wherein Nb, Ti, C and N are in weight percentages.

And when the stoichiometric ratio in the above formula is 1.0 or more, the desired effects of the present invention can be enhanced to a maximum degree.

Regarding the stainless steel layer to be clad on the carbon steel, any austenite stainless steel which has a chemical composition as specified by JIS G4303 may be used. For example, SUS 304 stainless steel contains carbon in amounts not more than 0.08%. If the carbon content in this stainless steel is lowered to 0.05% or less, the annealing of hot coils in the course of the production of clad steels may be omitted.

According to the present invention, the thickness of the stainless steel layer to be clad on one side of the carbon steel sheet is preferably in the range of from 2.5% to 30% of the thickness of the final clad steel product. If the clad ratio is less than 2.5% there is a greater tendency that the thin outer layer of stainless steel is easily broken to expose the inner carbon steel sheet, hence damaging the corrosion resistance. For these reasons the thickness of the outer stainless steel layer should be not less than 2.5% on one side of the carbon steel sheet and not less than 5% when clad on both sides of the carbon steel sheet.

On the other hand, if the clad ratio on one side is larger than 30%, or more than 60% in total on both sides, the inherent advantages and merits of the clad steel products may be lost. Therefore, the upper limit of the clad ratio on one side should be not more than 30% or not more than 60% in total on both sides.

The stainless clad steel product according to the present invention may be produced by any conventionally known method. However, from the point of production cost, it is advantageous to clad the stainless steel on the carbon steel sheet by continuous casting. One example of the production method by continuous casting will be described hereinbelow.

As shown in FIG. 2, the carbon steel slab 1 is postured upright as a core material and around this core material is arranged a mold 2 on the upper end of which a refractory frame 3 is arranged. Around the outer wall of the refractory frame a high frequency heating coil 4 is provided to heat the stainless steel melt 5 poured into the refractory frame around the core material. As the core material is moved downward the stainless steel melt is clad around the core material in a thickness determined by the space between the core material and the surrounding mold, while the solidification of the melt is controlled by a control plate 6 and the mold is cooled by a cooling box 7 surrounding it.

Prior to the cladding of the stainless steel melt around the core material, a flux is coated on the surface of the core material and preheated to 700° to 1000° C. under protection against oxidation. This assures a complete interface bondage between the core material and the stainless steel melt. Other than the casting method, the stainless clad steel material according to the present invention may be produced by a conventional rolling method.

According to the present invention, it is not necessary to insert the nickel foil at the interface between the core material and the stainless steel layer as required by the conventional art so that the production cost is markedly lowered.

The stainless clad steel sheet according to the present invention may be used as hot rolled or as cold rolled. When used as hot rolled, the clad slab as obtained by casting is hot rolled at about 900° C., preferably at temperatures not lower than 950° C. to relieve the stress caused during the hot rolling. For full recrystallization and full grain growth in the stainless steel layer to obtain a high degree of elongation, it is desirable to anneal the sheet at temperatures not lower than 950° C.

Alternatively, the hot rolling of the clad sheet may be done with a finishing temperature not lower than 900° C. so as to cause full recrystallization in the stainless steel layer during the hot rolling to obtain a high degree of elongation, or the hot rolled clad sheet may be coiled at temperatures not higher than 600° C. or heat treated at temperatures not higher than 600° C.

In this case, if the heat treatment is performed at higher temperatures, chromium carbides precipitate first at the boundaries between the carbon steel sheet and the stainless steel layer and then the carbides precipitate all through the stainless steel layer to deteriorate the corrosion resistance.

Also, after the hot rolling, the precipitation of the chromium carbides during the cooling to the coiling temperature or the heat treatment temperature must be avoided. For this purpose, it is desirable to control the carbon content in the stainless steel layer depending on the cooling after the hot rolling. For example, when the cooling rate is 10° C./S or more (e.g. in a hot strip mill), about 0.08% of carbon may be present, but at a cooling rate less than 10° C./S, it is desirable to maintain the carbon content in the range of from 0.02 to 0.03%.

When the clad steel sheet according to the present invention is used as cold rolled, the hot rolled coil is annealed at temperatures not lower than 900° C. as conventionally done, and the hot coil thus annealed is cold rolled not less than 10%, preferably 30% or more, and annealed at temperatures between the recrystallization temperature (for example 950° C.) of the stainless steel layer and 1100° C.

In this case when the carbon content in the stainless steel layer is limited to 0.05% or less, preferably 0.04% or less, and the hot coiling temperature is limited to 600° C. or lower in combination of the chemical composition of the carbon steel, or when the hot rolling finishing temperature is maintained at 900° C. or higher and the coiling temperature is limited to 600° C. or lower, the annealing of the hot coil may be omitted, because no danger of the grain boundary corrosion is anticipated without the annealing.

Further, when the carbon content in the stainless steel layer is maintained to 0.05% or less, preferably 0.04% or less, the excellent corrosion resistance and deep-drawability can be maintained even if the annealing temperature after the cold rolling is lowered to a range of from 900° to 950° C. In other words, the advantages of the present invention will be enhanced when the carbon content in the stainless steel layer is limited to 0.05% or less.

BRIEF EXPLANATION OF THE DRAWINGS

In FIG. 1, the comparative three-layer clad steel sheet A is composed of a carbon steel inner sheet containing 0.04% of carbon, 0.02% of silicon, 0.3% of manganese, 0.0025% of nitrogen and 0.050% of aluminum and a stainless steel outer layer (SUS 304) on both sides of the carbon steel sheet, and the three-layer clad steel sheet B according to the present invention is composed of a carbon steel inner sheet containing 0.0035% of carbon, 0.02% of silicon, 0.3% of manganese, 0.0030% of nitrogen, 0.036% of aluminum, and 0.07% of titanium and stainless steel outer layer (SUS 304) on both sides of the carbon steel sheet. Both the comparative clad steel sheet A and the clad steel sheet B according to the present invention, having a clad ratio ranging from 0 to 60%, are hot rolled to 4 mm thick with a finishing temperature of 910° C., cold rolled to 0.5 to 0.8 mm thick and annealed at 1100° C.

Figure 1:
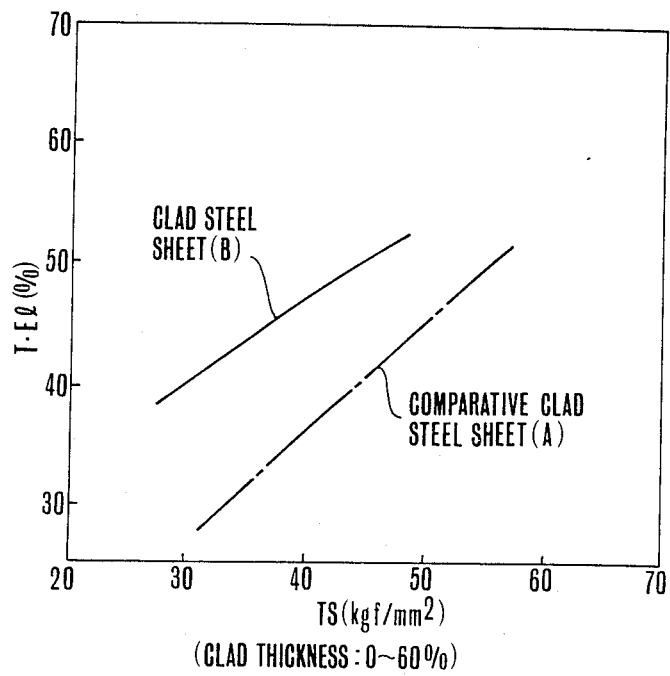
FIG. 1 shows the relation between the tensile strength (corresponding to the clad thickness from 0 to 60%) and the elongation of the clad steel sheet according to the present invention and a comparative clad steel sheet.
Figure 2:
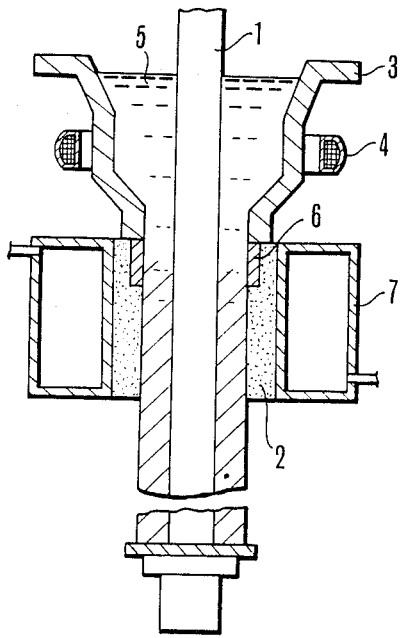
FIG. 2 shows schematically the apparatus for continuously casting the molten stainless steel around the carbon steel slab to obtain a stainless clad steel slab.

As compared with the comparative clad steel sheet A, the clad steel sheet B according to the present invention shows a higher level of ductility for the same tensile strength.

EXAMPLE 1

In Table 1, the chemical compositions of the inner carbon steel sheet and the outer stainless steel layers of the stainless clad steel sheets according to the present invention and the comparative clad steel sheet and their clad ratios are shown.

These clad steel sheets are prepared by hot rolling clad steel slabs of 250 mm thick obtained by the casting method described hereinbefore to 4.0 mm thick and coiling at 600° C., then annealing the hot coils (A, B-1, C-1 and D-1) at 1100° C., and then cold rolling to 0.8 mm and annealing at 1100° C. Some of the clad sheets of the present invention (B-2, C-2 and D-2) are not annealed after the hot rolling.

In Table 2, the tensile strength and corrosion resistance of the clad sheets of Table 1 are shown. The clad sheets according to the present invention show markedly high elongation as compared with the comparative clad sheets for the same tensile strength.

EXAMPLE 2

In Table 3, the chemical compositions of the inner carbon steel sheet and the outer stainless steel layers of the stainless clad steel sheets according to the present invention and the comparative clad steel sheet and their clad ratios are shown.

These clad steel sheets are prepared by hot rolling clad steel slabs of 250 mm thick obtained by the casting method described hereinbefore, to 4.0 mm thick, annealing at 1100° C. then cold rolling to 0.8 mm thick and finally annealing at 1100° C. The clad steel sheet B in the table is as hot rolled and annealed.

The tensile strength and corrosion resistance of these clad steel sheets are shown in Table 4. The clad steel sheets according to the present invention show markedly high elongation compared with the comparative clad steel sheet for the same tensile strength.

TABLE 1

|  |  | Thickness Ratio | C (wt %) | Si | Mn | P | S | Al | N | Cr | Ni | Ti | Nb |
|---|---|---|---|---|---|---|---|---|---|---|---|---|---|
| Comparative Clad Sheet A | Carbon Steel Layer | 0.8 | 0.03 | 0.01 | 0.30 | 0.015 | 0.013 | 0.050 |  |  |  |  |  |
|  | Stainless Steel Layer | 0.1 + 0.1 | 0.05 | 0.2 | 1.25 | 0.020 | 0.008 |  |  | 18.2 | 8.2 |  |  |
| Present Clad Sheet B | Carbon Steel Layer | 0.8 | 0.0030 | 0.01 | 0.20 | 0.010 | 0.010 | 0.030 | 0.0030 |  |  | 0.050 |  |
|  | Stainless Steel Layer | 0.1 + 0.1 | 0.03 | 0.3 | 1.3 | 0.020 | 0.005 |  |  | 18.1 | 8.5 |  |  |
| Present Clad Sheet C | Carbon Steel Layer | 0.8 | 0.0040 | 0.02 | 0.25 | 0.011 | 0.011 | 0.035 | 0.0025 |  |  | 0.010 | 0.020 |
|  | Stainless Steel Layer | 0.1 + 0.1 | 0.03 | 0.2 | 1.2 | 0.0015 | 0.008 |  |  | 18.2 | 8.3 |  |  |
| Present Clad Sheet D | Carbon Steel Layer | 0.4 | 0.0040 | 0.02 | 0.25 | 0.011 | 0.011 | 0.035 | 0.0025 |  |  | 0.010 | 0.020 |
|  | Stainless Steel Layer | 0.3 + 0.3 | 0.03 | 0.2 | 1.2 | 0.0015 | 0.008 |  |  | 18.2 | 8.3 |  |  |

TABLE 2

|  | Tensile Strength (L) | | | | Corrosion Resistance (Salt Spray Test) | Annealing Of Hot Rolled Plate |
|---|---|---|---|---|---|---|
|  | YP (kgf/mm$^2$) | TS (kgf/mm$^2$) | El (%) | El/TS | | |
| A | 23.0 | 40 | 36 | 0.9 | Good | Done |
| B-1 | 20.0 | 35.0 | 43.0 | 1.23 | Good | Done |
| C-1 | 21.0 | 30.0 | 42.0 | 1.16 | Good | Done |
| B-2 | 19.8 | 34.9 | 43.1 | 1.23 | Good | None |
| C-2 | 20.9 | 36.0 | 41.5 | 1.15 | Good | None |
| D-1 | 23.7 | 49.0 | 54.5 | 1.11 | Good | Done |
| D-2 | 23.5 | 49.0 | 54.0 | 1.10 | Good | None |
| B-3 | 31.5 | 38.0 | 49.5 | — | Good | None (As hot rolled, |

TABLE 2-continued

| | Tensile Strength (L) | | | | Corrosion Resistance | Annealing Of Hot |
| --- | --- | --- | --- | --- | --- | --- |
| YP (kgf/mm²) | TS (kgf/mm²) | El (%) | El/TS | | (Salt Spray Test) | Rolled Plate |
| | | | | | | 4.0 mm thick) |

TABLE 3

| | | Thickness Ratio | C (wt %) | Si | Mn | P | S | Al | N | Cr | Ni | Ti | Nb |
| --- | --- | --- | --- | --- | --- | --- | --- | --- | --- | --- | --- | --- | --- |
| Comparative Clad Sheet A | Carbon Steel Layer | 0.8 | 0.03 | 0.01 | 0.30 | 0.015 | 0.013 | 0.050 | | | | | |
| | Stainless Steel Layer | 0.1 + 0.1 | 0.05 | 0.2 | 1.25 | 0.020 | 0.008 | | | 18.2 | 8.2 | | |
| Present Clad Sheet B | Carbon Steel Layer | 0.8 | 0.0030 | 0.01 | 0.20 | 0.010 | 0.010 | 0.030 | 0.0030 | | | 0.050 | |
| | Stainless Steel Layer | 0.1 + 0.1 | 0.05 | 0.3 | 1.3 | 0.020 | 0.005 | | | 18.1 | 8.5 | | |
| Present Clad Sheet C | Carbon Steel Layer | 0.8 | 0.0040 | 0.02 | 0.25 | 0.011 | 0.011 | 0.035 | 0.0025 | | | 0.010 | 0.020 |
| | Stainless Steel Layer | 0.1 + 0.1 | 0.06 | 0.2 | 1.2 | 0.0015 | 0.008 | | | 18.2 | 8.3 | | |
| Present Clad Sheet D | Carbon Steel Layer | 0.4 | 0.0040 | 0.02 | 0.25 | 0.011 | 0.011 | 0.035 | 0.0025 | | | 0.010 | 0.020 |
| | Stainless Steel Layer | 0.3 + 0.3 | 0.06 | 0.2 | 1.2 | 0.0015 | 0.008 | | | 18.2 | 8.3 | | |

TABLE 4

| | Tensile Strength (L) | | | | Corrosion Resistance |
| --- | --- | --- | --- | --- | --- |
| | YP (kgf/mm²) | TS (kgf/mm²) | El (%) | El/TS | (Salt Spray Test) |
| A | 23.0 | 40 | 36 | 0.9 | Good |
| B | 20.0 | 35.0 | 43.0 | 1.23 | Good |
| C | 21.0 | 36.0 | 42.0 | 1.16 | Good |
| D | 23.7 | 49.0 | 54.5 | 1.11 | Good |
| BH | 32.0 | 39.0 | 50.0 | – | Good |

What is claimed is:

1. A stainless clad steel sheet of about 0.5 to 0.8 mm thickness comprising a carbon steel sheet consisting of not more than 0.0045% of carbon, not more than 0.5% of manganese, not more than 0.080% of aluminum, not more than 0.02% of silicon contained as unavoidable impurity, not more than 0.0050% of nitrogen, and at least one of titanium and niobium under the following conditions:

(Ti+Nb) ... not more than 0.15%

$$\frac{Nb}{7.74C} + \frac{Ti}{4C + 3.43N} \ldots \text{not less than } 0.8\%,$$

with the balance being Fe, and an austenite stainless steel layer on at least one side of said carbon steel sheet.

2. The stainless clad steel sheet composite according to claim 1, wherein said stainless steel layer on one side of said carbon steel sheet has a thickness amounting to from 2.5 to 30% of the total thickness of the clad steel sheet.

3. The stainless clad steel sheet composite to claim 1, wherein said stainless steel layer contains not more than 0.05% of carbon.

4. The stainless clad steel sheet composite according to claim 1, which is obtained by hot rolling a stainless clad steel slab prepared by a continuous casting method.

5. The stainless clad steel sheet composite according to claim 1, which is obtained by hot rolling and cold rolling a stainless clad steel slab prepared by a continuous casting method.

6. The stainless clad steel sheet composite according to claim 1, which is obtained by hot rolling a stainless clad steel slab, and annealing at a temperature not lower than 900° C.

7. The stainless clad steel sheet composite according to claim 1, which is obtained by hot rolling a stainless clad steel slab with a finishing temperature not lower than 900° C. and hot coiling at a temperature not higher than 600° C.

8. The stainless clad steel sheet composite according to claim 1, which is obtained by hot rolling a stainless clad steel slab, annealing at a temperature not lower than 900° C., cold rolling with at least 10% reduction, and annealing at a temperature in a temperature range of from a recrystallization temperature of said stainless steel layer to 1100° C.

9. The stainless clad steel sheet composite according to claim 1, which is obtained by hot rolling a stainless clad steel slab, hot coiling at a temperature not higher than 600° C., cold rolling with at least 10% reduction, and annealing at a temperature in a temperature range of from a crystallization temperature of the stainless steel layer to 1100° C.

* * * * *